(12) United States Patent
Levato et al.

(10) Patent No.: US 11,506,101 B2
(45) Date of Patent: Nov. 22, 2022

(54) AFTER TREATMENT SYSTEM FOR A VEHICLE

(71) Applicant: CNH Industrial America LLC, New Holland, PA (US)

(72) Inventors: Luca Levato, Modena (IT); Francesco Paolini, Modena (IT); Fabio Pescione, Modena (IT); Francesco Fenili, Dalmine (IT); Attilio Fiorentino, Turin (IT)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 17/430,288

(22) PCT Filed: Feb. 11, 2020

(86) PCT No.: PCT/EP2020/053389
§ 371 (c)(1),
(2) Date: Aug. 11, 2021

(87) PCT Pub. No.: WO2020/165121
PCT Pub. Date: Aug. 20, 2020

(65) Prior Publication Data
US 2022/0127993 A1  Apr. 28, 2022

(30) Foreign Application Priority Data
Feb. 11, 2019  (IT) .......... 102019000001933

(51) Int. Cl.
*F01N 1/00* (2006.01)
*F01N 3/28* (2006.01)
*F01N 3/20* (2006.01)

(52) U.S. Cl.
CPC ......... *F01N 3/2892* (2013.01); *F01N 3/2066* (2013.01); *F01N 2240/20* (2013.01);
(Continued)

(58) Field of Classification Search
CPC .. F01N 3/2892; F01N 3/2066; F01N 2240/20; F01N 2610/1453
(Continued)

(56) References Cited

U.S. PATENT DOCUMENTS 8,359,838 B2 *  1/2013  Yamazaki ............ F01N 3/2882
60/297
10,024,217 B1  7/2018  Johnson et al.
(Continued)

FOREIGN PATENT DOCUMENTS

CN  105587386     5/2016
CN  107178412 A *  9/2017  ........... F01N 13/141
(Continued)

OTHER PUBLICATIONS

English translation of PCT Patent Application WO-2018045883 A1 (Mar. 2018) (Year: 2018).*
(Continued)

*Primary Examiner* — Jason D Shanske
(74) *Attorney, Agent, or Firm* — Rickard DeMille; Rebecca Henkel

(57) ABSTRACT

An after treatment system (ATS) module for a vehicle includes, fluidly connected in series, an inlet, a plurality of chemical reaction modules and an urea mixer module. The chemical reaction modules are arranged to define a substantial quadrangular path of a flow of exhaust gases flowing in the ATS module. The urea mixer module is perpendicular to all the plurality of chemical reaction modules. The ATS module also includes deflector means configured to impart a swirling motion to the flow before flow enters in urea mixer module.

11 Claims, 5 Drawing Sheets

(52) U.S. Cl.
CPC ...... *F01N 2590/08* (2013.01); *F01N 2610/02* (2013.01); *F01N 2610/1453* (2013.01)

(58) Field of Classification Search
USPC .......................................................... 60/324
See application file for complete search history.

(56) References Cited

U.S. PATENT DOCUMENTS

| | | | | |
|---|---|---|---|---|
| 2011/0162353 | A1* | 7/2011 | Vanvolsem | B01F 25/4521 60/299 |
| 2012/0151902 | A1* | 6/2012 | Yi | B01F 25/3131 60/303 |
| 2014/0109557 | A1* | 4/2014 | Calvo | B01F 25/3141 60/324 |
| 2014/0230418 | A1* | 8/2014 | Perrot | B01F 25/4337 60/324 |
| 2015/0040537 | A1* | 2/2015 | Hicks | B01F 25/3131 60/273 |
| 2015/0275728 | A1* | 10/2015 | Braun | F01N 13/009 60/324 |
| 2016/0069239 | A1* | 3/2016 | Freeman | F01N 13/1888 60/324 |
| 2016/0115847 | A1* | 4/2016 | Chapman | B01F 23/2132 60/324 |
| 2016/0305296 | A1* | 10/2016 | Tobe | B01F 25/10 |
| 2016/0326931 | A1* | 11/2016 | Freeman | F01N 3/2066 |
| 2019/0101037 | A1* | 4/2019 | Golin | F01N 3/021 |
| 2021/0199039 | A1 | 7/2021 | Panunzio et al. | |
| 2021/0363906 | A1* | 11/2021 | Niaz | F01N 3/2892 |

FOREIGN PATENT DOCUMENTS

| | | | |
|---|---|---|---|
| DE | 202015102092 U1 * | 9/2015 | ............. F01N 13/02 |
| EP | 3093463 | 11/2016 | |
| WO | WO-2009024815 A2 * | 2/2009 | ......... B01F 3/04049 |
| WO | 2014167355 | 10/2014 | |
| WO | WO-2018045883 A1 * | 3/2018 | ............... F01N 3/28 |

OTHER PUBLICATIONS

PCT Application No. EP2020/053389, International Search Report and Written Opinion dated Mar. 9, 2020, 13 pgs.

* cited by examiner

AFTER TREATMENT SYSTEM FOR A VEHICLE

CROSS REFERENCE TO RELATED APPLICATIONS

This application is a U.S. National Stage filing of International Application Serial No. PCT/EP2020/053389 entitled "IMPROVED AFTER TREATMENT SYSTEM FOR A VEHICLE," filed Feb. 11, 2020, which claims priority to Italian Application Serial No. 102019000001933, filed Feb. 11, 2019, each of which is incorporated by reference herein in its entirety for all purposes.

TECHNICAL FIELD

The present invention concerns an after treatment system for a vehicle, in particular an improved after treatment system for exhaust gas of a vehicle, in particular of a work vehicle.

BACKGROUND OF THE INVENTION

Diesel vehicles, in particular easy and work vehicles, need to treat exhaust gases coming from the engine before their emission in the environment in order to decrease level of pollute elements such as nitrogen oxide or particulate.

In order to achieve such treatment, it is known to use systems known as After Treatment Systems (ATS) comprising a series of elements such as Diesel Oxidation Catalysts (DOC), Urea (i.e. AdBlue® urea solution) Injection Module, Diesel Particulate Filters (DPF) or Selective Catalytic Reduction (SCR); this latter may comprise more intermediate elements such as SCRoF (Selective Catalytic Reduction on Filter) and SCR-CUC (Clean Up Catalyst).

In the above mentioned systems it is essential to provide a correct mixing between urea (injected through dosing modules) and exhaust gases flow flowing out from DOC module before its passage into SCR in order to generate a gas mixture which allows the correct execution of chemical reactions for the abatement of the nitrogen oxide contained in exhaust gases.

To obtain the above described mixing of urea and exhaust gases it is known to provide after treatment systems which has a great linear extension and in which urea injection module comprises an inclined dosing module which inject urea solution in a long mixing conduit. Such conduit is long to provide a volume which is big enough to guarantee a correct mix of the exhaust gases with the urea solution. However, such long conduit increases the encumbrance of ATS in the vehicle.

To solve the aforementioned problem, it is possible to inject urea at higher pressure into the exhaust gas flow; this allows to use shorter mixing conduits, however high pressure urea dosing modules are more expensive and need peculiar urea feeding circuits which are more expensive and prone to breakage than "standard" dosing module (at lower pressures) and related circuit.

A correct mixing of urea solution into exhaust gases is essential, otherwise urea could crystallize on inner walls of conduit of the ATS; this drawback generates from the fact that the injected urea is at environment temperature, i.e. about 25° C., while the exhaust gas is at a temperature of at least 300° C.

In view of the above, it is essential to avoid an excessive loss of temperature in the mixing module because, first, the efficiency of chemical reduction reactions is decreased and further because the possibility of formation of ammonia crystal is reduced at high temperature. Again, the presence of a long linear mixing conduit introduces a significant drop of temperature of exhaust gases that impacts efficiency.

Moreover, a long mixing conduit, as the one described above, increases the pressure drop between inlet and outlet of the ATS while it is necessary to have a minimal pressure drop of ATS to improve engine efficiency.

Therefore, the need is felt to provide an ATS which allows a correct mixing of urea solution with the exhaust gas flow, which is compact, which does not rise manufacturing costs and which does not increase the standard pressure drop between inlet and outlet of the ATS.

An aim of the present invention is to satisfy at least one of the above mentioned needs.

SUMMARY OF THE INVENTION

The aforementioned aim is reached by an ATS as claimed in the appended set of claims.

BRIEF DESCRIPTION OF DRAWINGS

For a better understanding of the present invention, a preferred embodiment is described in the following, by way of a non-limiting example, with reference to the attached drawings wherein.

DETAILED DESCRIPTION OF THE INVENTION

The present description has been directed to an agricultural vehicle comprising an ATS according to the present invention, merely for sake of example. However, it is clear that such example is non-limitative and that the ATS according to the present invention may be applied to other typologies of vehicles.

Figure 1:
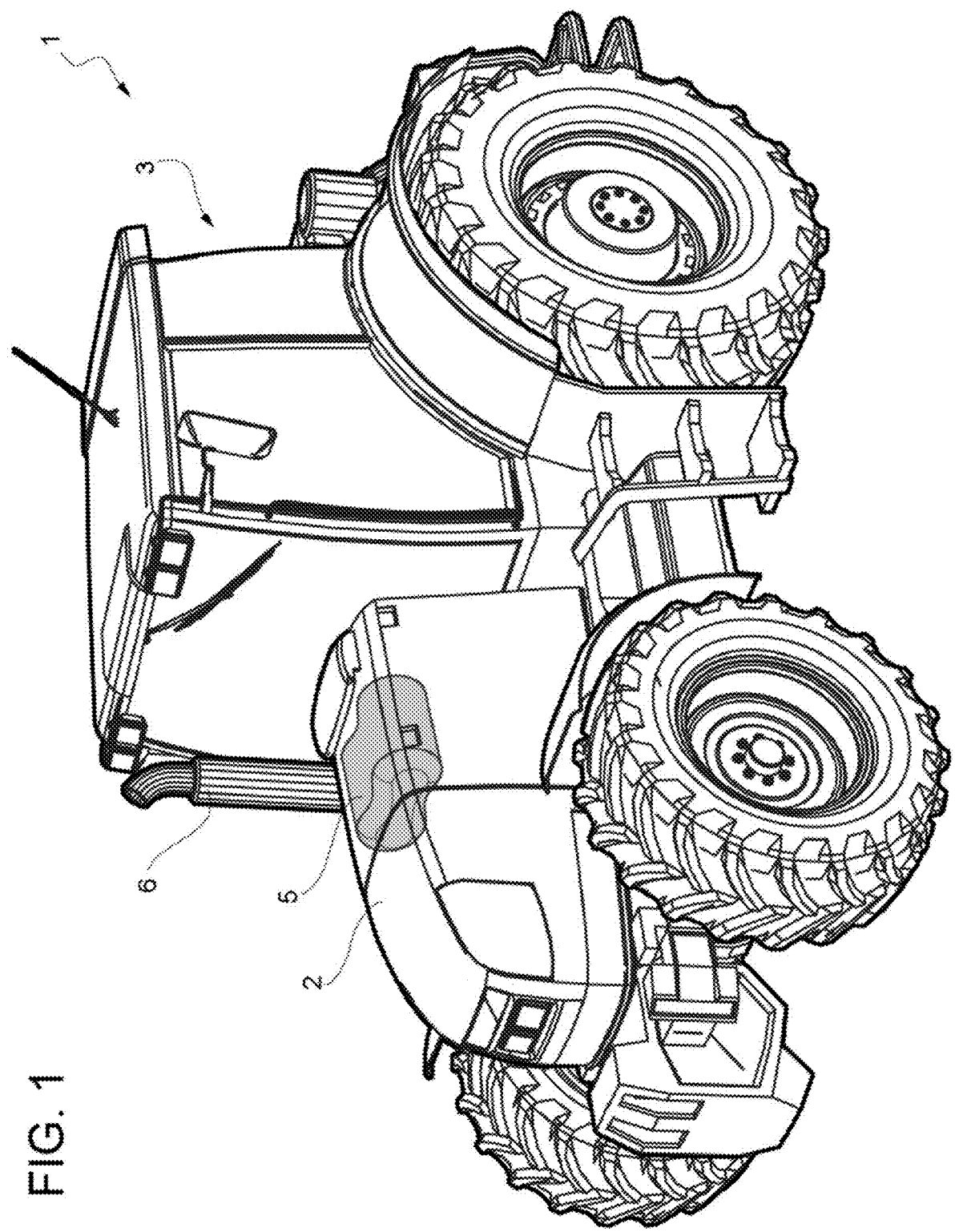
FIG. 1 is a perspective view, with parts removed for sake of clarity, of a vehicle comprising a ATS according to the present invention.

FIG. 1 discloses an agricultural vehicle 1 of known typology, e.g. a wheeled tractor, comprising, just above the motor (not shown) which is housed in a top front portion 2 of cab 3, an ATS module 5 according to the present invention. ATS is fluidly connected, as known, to an outlet of the engine of vehicle 1 and to an outlet tube 6.

Figure 2:
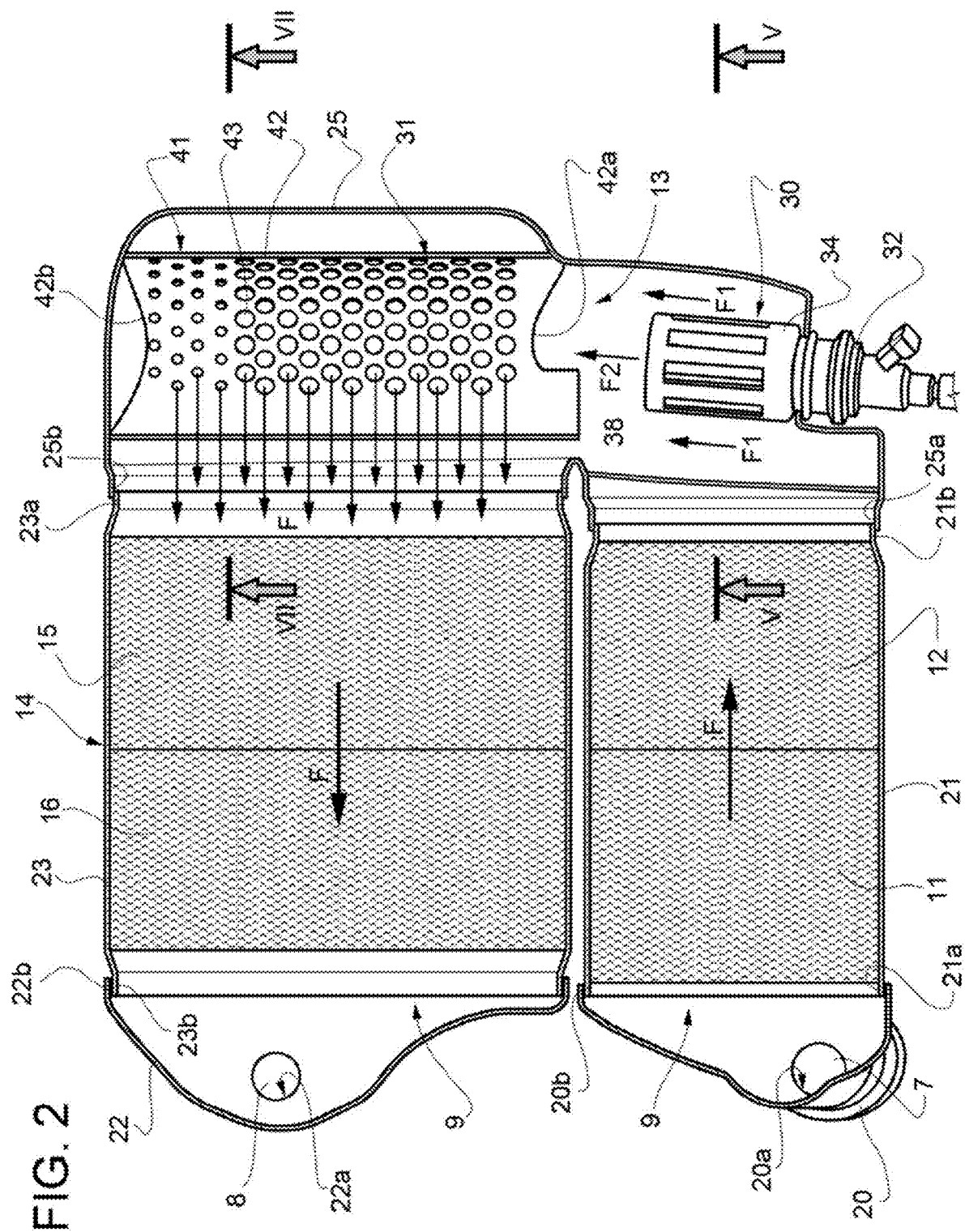
FIG. 2 is a longitudinal section view of an ATS according to the present invention.
Figure 3:
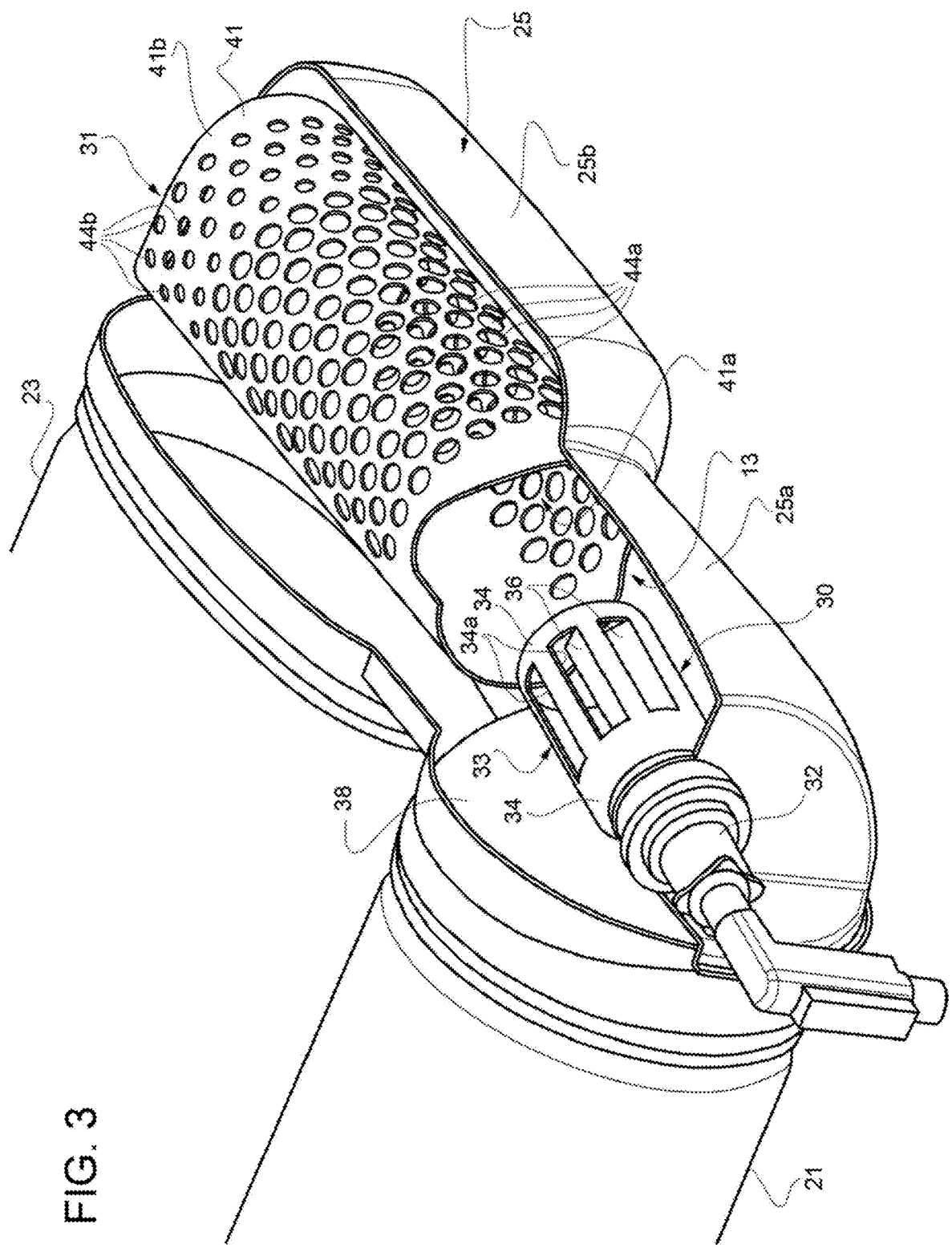
FIG. 3 is a perspective section view of a portion of the ATS of FIG. 2.

As shown in greater detail in FIG. 2, ATS 5 comprises an inlet 7, fluidly connectable to the output of the engine of the vehicle, and an outlet 8, fluidly connectable to the outlet tube 6 of the vehicle and an ATS 9, fluidly interposed between inlet 7 and outlet 8, which may comprise, fluidically connected in series from inlet 7 to outlet 8, a DOC 11, a DPF 12, urea mixer module 13, a catalyst module 14 that comprise a SCRoF 15 and a SCR-CUC 16.

In particular, inlet 7 may be realized as an inlet duct 20 which is coupled to a first opening 21a of a fitting 21 so as to be fluidly connected to the latter. For sake of example, duct 20 comprises a first opening 20a, fluidly connected to the engine output and second opening 20b fluidly connected to an inlet 21a of fitting 21.

Such flow F coming from inlet 7 to DOC 11 may be inserted in ATS 9 with any direction, i.e. any angle may be provided between inlet 7 and DOC 11; in the described example inlet 7 is substantially perpendicular to DOC 11.

Fitting 21 carries DOC 11 and DPF 12 to allow flow F of exhaust gases passage from engine outlet inside DOC and DPF to flow out from a second opening 21b of fitting 21. Preferably fitting 21 has substantially a cylindrical shape and accordingly flow F has a substantial linear path inside DOC 11 and DPF 12.

Outlet 8 may be realized as an outlet duct 22 which is coupled to a fitting 23 carrying catalyst module 14 so as to fluidly connect this latter to the outlet tube 6. In the described example duct 22 comprises a first opening 22a, fluidly connected to the outlet tube 6 and second opening 22b fluidly connected to an outlet 23a of fitting 23.

Fitting 23 carries catalyst module 14, i.e. SCR 15 and SCR-CUC 16, to allow flow F of exhaust gases passage through these latter from an inlet 23a of fitting 23 to outlet 23b. Preferably fitting 23 has substantially a cylindrical shape and accordingly flow F has a substantial linear path inside catalyst module 14.

Advantageously, flow F of gas inside fitting 21 and inside fitting 23 are parallel but of opposed direction one with respect to the other.

Fittings 21 and 23 are fluidly connected together by a joint fitting 25 comprising an inlet 25a coupled to outlet 21b of fitting 21 and an outlet 25b coupled to inlet 23a of fitting 23. Preferably such couplings are press fitted shape coupling.

Fitting 25 is configured to make flow F coming from fitting 21 to change direction of 180° during inside joint fitting 25 before entering into fitting 23. Joint fitting 25 is further configured to house the urea mixer module 13. It should be noted that urea mixer module 13 is substantially perpendicular with respect to flow F, coming from fitting 21. In particular urea mixer module 13 is preferably perpendicular with respect to such flow or inclined within an angle of about 30° with respect to such flow.

As can be clearly seen in FIG. 2, flow F describes into ATS 9 a substantially squared path in which chemical reaction modules 11, 12, 14 are placed all adjacent to the other and in which urea mixer module 13 is substantially perpendicular to such chemical reaction modules 11, 12, 14.

The dimensions of the above described layout of ATS module 5 may be varied in a modular way in order to be used for motors having a different displacement. Greater displacement implies a greater emission of exhaust gases and a proportional request of chemical reduction reactions in chemical reaction modules 11, 12, 14. Accordingly, such increased demand of performances may be achieved by increasing the diameter or the length of such elements.

Consequently, ducts 20, 22 and fittings 21, 23, 25 can be configured to be used also in the case of different length of chemical reaction modules 11, 12, 14, if diameter is constant; in this way ATS module 5 may be modifies in a modular way to adapt to a different engine. Indeed, the same structure and element, with few modifications, i.e. simply the substitution of chemical reaction modules 11, 12, 14 may be used for a great variety of engines. Moreover, fittings 21, 23, 25 may be realized thanks to metal sheet elements which can easily be reconfigured.

ATS module 5 further comprises a plurality of sensors (not shown) configured to detect a plurality of chemical and thermodynamic properties of flow F flowing in ATS 9. For sake of example nitrogen oxide sensors or pressure and temperature sensors may be provided and connected to an electronic unit (not shown) of vehicle 1 to control the operation of ATS elements.

ATS module 5 may further advantageously comprises an housing comprising a plurality of walls defining an inner volume into all the above described element may be housed in its entirety. Housing should obviously be provided with two openings for inlet 7 and for outlet 8 of ATS 9. As known, ATS module 5 may be also provided, between walls of such housing and ATS, of thermal insulating elements so as to reduce the heat dispersion from ATS 9 to the environment. Such thermal insulating elements may comprise thermal insulating wool which fills the space between walls of housing and ATS 9 or any other typology of known thermal barriers.

Making reference to FIGS. 3 to 7, urea mixer module 13 will be described hereinafter in greater detail.

Urea mixer module 13 comprises a dosing module 30, preferably a dosing module, working at a pressure between 5 up to 20 bar, for injecting urea solution into ATS path. Dosing module 30 may be carried by fitting 25 and it is positioned substantially orthogonally with respect to the direction of flow F of exhaust gases coming from DPF 12. In particular, dosing module 30 is preferably perpendicular with respect to such flow or inclined within an angle of about 30° with respect to such flow.

Urea mixer module 13 further comprises a mixer module 31 positioned downstream with respect to dosing module 31 and configured to further mix urea into exhaust gas before passage of gas flow into catalyst module 14.

Figure 4:
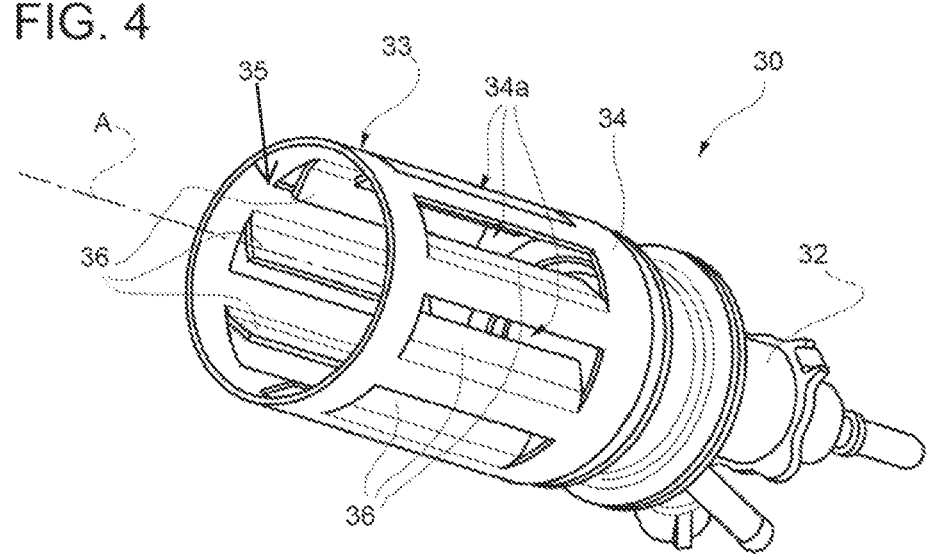
FIG. 4 is a perspective view of an element of the ATS according to the present invention.
Figure 5:
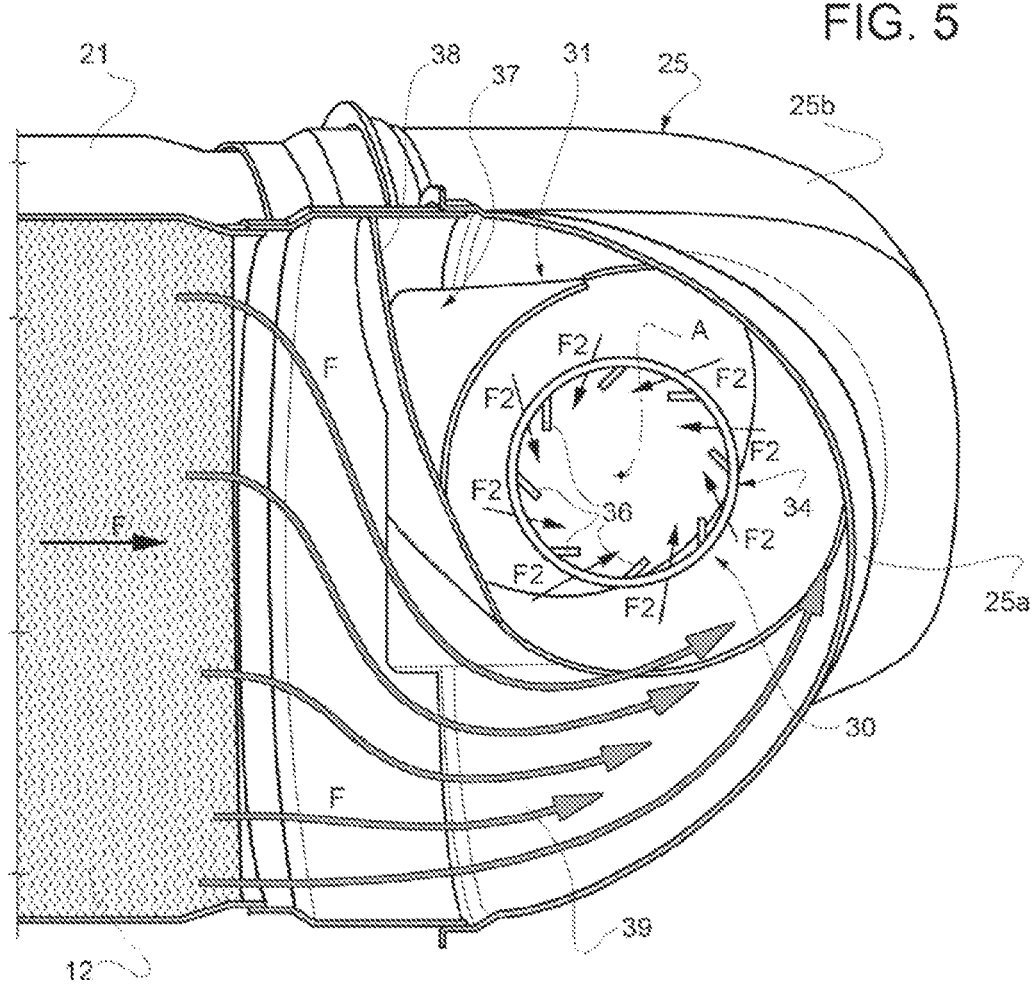
FIG. 5 is a schematic section view along line V-V of ATS of FIG. 2.

As better depicted in FIG. 4, dosing module 30 comprises essentially an injector 32 of known typology and an auxiliary mixing device 33 configured to mix urea as soon as injected into ATS path. In particular, auxiliary mixing device 33 comprises a shell e.g. shaped as a cylindrical element 34 of axis A carried by injector 32 and arranged coaxially around and extending axially getting away from this latter. In this way, cylindrical element 34 defines a surrounding volume 35 inside which injector 32 is partially housed.

Cylindrical element 34 further comprises a plurality of openings 34a configured to allow fluidic passage of exhaust gas from the external with respect to cylindrical element 34 inside volume 35. In particular, according to the disclosed embodiment, openings 34a are circumferentially equally spaced around axis A and have a substantially rectangular shape in which the longer side is parallel to the aforementioned longitudinal axis.

Cylindrical element 34 further comprises, for each opening 34a, a baffle 36 which open inclined with respect to cylindrical element 34, e.g. inclined inside volume 35 configured to generate a swirl motion of the gas inside volume 35. In particular each baffle 36 has a substantially rectangular shape and extends, inclined, from the longer side of each opening 34a. Preferably such inclination angle is equal for all baffles 36; more preferably such angle has a value comprised between 35° and 45°, preferably 40°. Preferably baffles 36 are aligned so as to generate a counter clock-wise swirl according to the direction of the first baffle/deflector.

According to one aspect of the invention, ATS 5 advantageously comprises deflector means 37 configured to initiate a swirled motion to exhaust gas flow before their passage into mixing module 30.

Deflector means 37 advantageously comprises at least a baffle 38 exemplarily carried by fitting 25 and configured to extend into gas path so as to generate a narrowing 39 and therefore to force fluid to introduce in dosing module 30 so that an improved swirling motion is generated inside volume 35. In particular baffle 38 has a curved shape; preferably said baffle extends with a convex portion faced to flow F of exhaust gases or, alternatively, it has a S-shape comprising two portions, a first portion which is convex and a second portion which is concave with respect to flow F.

To further improve such effect, fitting 25 comprises a first portion 25a encompassing dosing module 30 and a second portion 25b encompassing mixer module 31; first portion 25a has a contour shape which can be contained inside the contour shape of portion 25b. In the disclosed embodiment into which portions 25a, 25b are substantially cylindrical, portions 25a diameter is lower than portion 25b diameter.

According to the above construction, exhaust gas flow passing into dosing module 30 will intercept the cylindrical element 34 with increased velocity and an initial swirling motion which is further increase by the passage into openings 34a and baffles 36.

Figure 6:
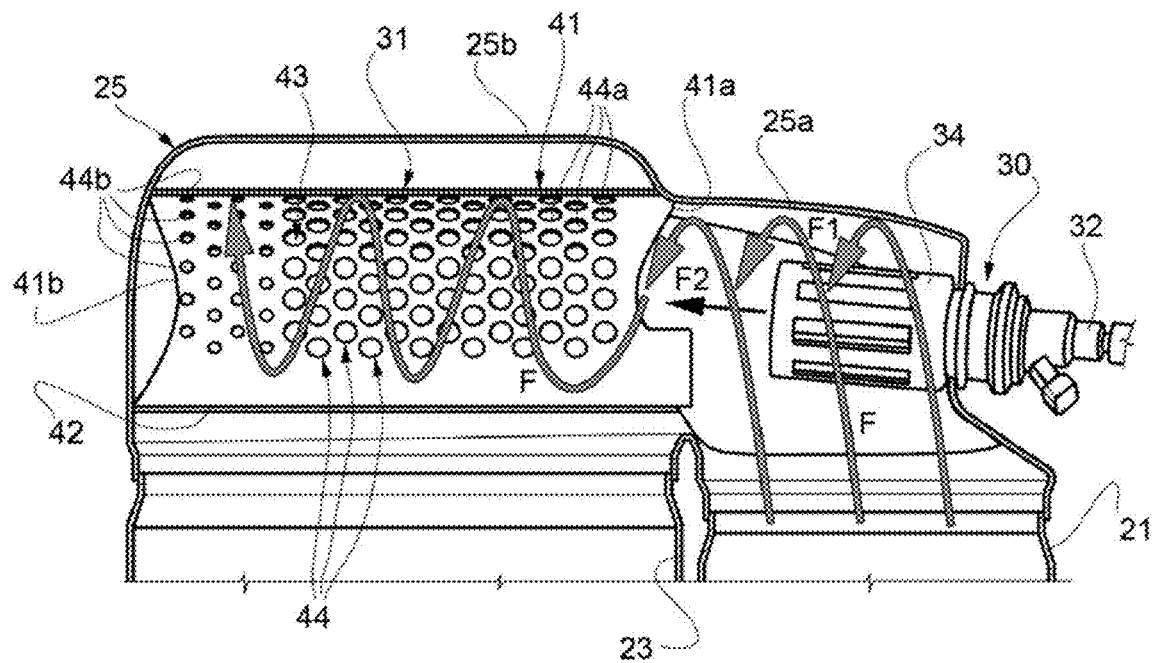
FIG. 6 is a partial perspective section view of a portion of the ATS of FIG. 2.
Figure 7:
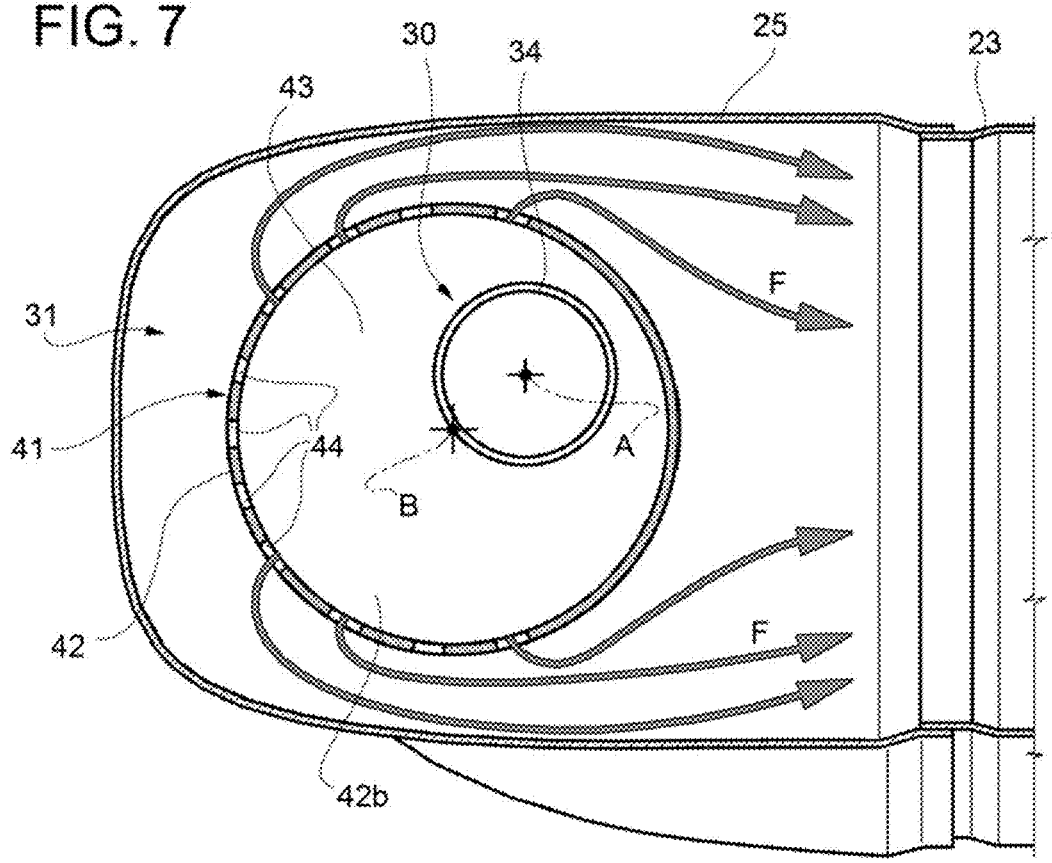
FIG. 7 is a schematic section view along line VII-VII of ATS of FIG. 2.

Mixer module 31, as better shown in FIGS. 6 and 7, essentially comprises a shell e.g. shaped as a cylindrical element 41 having a diameter greater than cylindrical element 34 of dosing module 30 and positioned inside portion 25b of fitting 25. Preferably, cylindrical element 41 has an axis B which is preferably positioned substantially parallel to axis A of cylindrical element 34 and comprises a lateral wall 42 defining at least first axial opening 42a faced to dosing module 30 and, optionally as disclosed, a second axial opening 42b axially opposite to first opening 42a. Lateral wall 42 defines an inner volume 43 into which swirled exhaust gas flow passes coming from dosing module 30.

Cylindrical element 41 further comprises a plurality of openings 44 configured to allow the passage of the swirled exhaust gas flown from inner volume 43 towards catalyst module 14. In particular, at least an opening 44a may have a dimension different with respect to another opening 44b, more preferably such openings 44a, 44b are all circular shape openings and have different diameters.

According to the disclosed embodiment, cylindrical element 41 comprises a first plurality of openings 44a and a second plurality of openings 44b both being circular and wherein first openings 44a have a bigger diameter with respect to openings 44b. Openings 44a are all placed together in a first portion of element 41 nearer to dosing module 30 and openings 44b are all placed together in a second portion of element 41 totally encompassed by portion 25b of fitting 25. In particular first portion comprising first opening 44a extends over at least two thirds of the entire longitudinal length of element 41.

The operation of the ATS module 5 according to the present invention is the following.

Exhaust gases flow F enters from inlet 7 and flows through first DOC 11 and DPF 12. In DOC 11 known chemical reactions reduces hydrocarbons into water and carbon dioxide, as known.

Once passed through DPF 12 or solely DOC 11, flow F enters into urea mixer module 13 and, in particular, into dosing module 30 passing by narrowing 39 thereby acquiring velocity and, initiating a swirling motion. Such swirling motion is further increased by interacting with walls defining portion 25a.

Then, a first portion F1 of flow F passes around cylindrical element 34 while a second portion F2 of flow F passes into volume 35 through openings 34a. Second portion F2 is much greater than first portion F1, i.e. can be greater than 60% of the total flow F.

When entering in openings 34a, portion F2 increases the initiated swirled motion and receives an injection of urea solution from injector 32. Injection of urea is substantially coaxial with axis A of cylindrical element 34, which is consequently the axis around which swirl of flow F1 is generated. In this way urea is mixed efficiently with exhaust gases thereby avoiding formation of ammonia crystals on cylindrical element 34.

Once flowed out from cylindrical element 34, a further mixing is achieved because flow F1 mix again with flow F2 coming from the around of cylindrical element 34 and flows inside volume 43 defined by element 41 of mixer module 31.

Urea mixture inside volume 43, due to the immediate presence of fitting 25, or being closed opposite to opening 42a, at the end of element 41, is forced to flow out from openings 44a and 44b. In particular, the majority of flow passes through larger openings 44a and a minor portion of flow passes through smaller openings 44b, with increased velocity due to the smaller passage.

Then, from mixer module 31, mixture of urea and exhaust gases flows through catalysts module 14. Here, such mixture starts the reduction chemical reactions which transforms nitrogen oxide into nitrogen and water.

Once exit from catalysts module 14, purified gas flows through outlet 8 towards outlet tube 6.

In view of the foregoing, the advantages of an ATS according to the invention are apparent.

Thanks to the fact that the flow path of gases into ATS 9 is substantially squared, dimensions of ATS module 5 are reduced, and consequently it is obtained a reduction of encumbrance of the ATS module 5 in the vehicle.

Thanks to the fact that mechanical coupling between fittings and the relative ATS subsystem are reversible, ATS module 5 is modular since each ATS subsystem may be substituted, for a repair or improvement issue, without substantially modifying the global structure of ATS module 5.

Furthermore, the layout of the system can be swapped without losing the performance.

Dosing module 30 allows a good mixing of urea into exhaust gases flow F; indeed such effect is guaranteed thanks to the improved swirling motion that openings 34a and 36 imparts to flow F2 entering in volume 35. Such flows F2 receive already an initiated swirling motion into narrowing 39 and thanks to shape of portion 25a of fitting 25 said flows thereby enter into the openings 34a with an increased velocity.

Moreover, mixer module 31 allows a further mixing of gas coming from flows F1 and F2 before it passes into the catalyst module 14 thereby improving uniformity of urea mixture in downstream catalyst. Furthermore it is possible to reduce the velocity of gas flow.

Furthermore, overall volume of ATS is maintained compact since all mixing devices are able to shorten and squeeze as much as possible the distance between the urea injection and catalysts, increasing the urea mixing and evaporation.

The fact that the dosing module is a 5 bar dosing module allows to use an economic dosing modules; the fact that such dosing module is perpendicular to the flow decreases the probability of formation of ammonia crystals on walls of mixer and allow to obtain the above mentioned squared path with the consequent advantages.

Moreover, the use of a mixer which is not long, even if turbulences are present inside this latter, maintain an acceptable value of drop of pressure between inlet 7 and outlet 7 of ATS 9.

Finally, the use of mechanical metal sheet elements allows an easy manufacturing of such elements and mechanical reversible couplings between these elements allow a quick assembly of ATS 9.

It is clear that modifications can be made to the described ATS module 5 which do not extend beyond the scope of protection defined by the claims.

For example, the shapes of various elements (e.g. cylindrical elements 34 and 41, openings 34a, 44) may be varied or some elements may optionally be included.

The described counter clockwise flow around mixing module may be designed as clockwise by inverting the position of deflector means and the shape of fitting 25.

Furthermore, fittings 20, 21, 22, 23, 25 may be have different shapes and be connected to each other in any other known way.

The invention claimed is:

1. An after treatment system module for a vehicle, the after treatment system module comprising:
    an inlet fluidly connected to an output of an engine of the vehicle;
    a plurality of chemical reaction modules;
    a urea mixer module arranged perpendicular to the plurality of chemical reaction modules, wherein the inlet, the plurality of chemical reaction modules, and the urea mixer module are fluidly connected in series, the urea mixer module comprises a mixer module configured to mix a urea solution with a flow of exhaust gases to create a urea mixture before passage to some of the plurality of chemical reaction modules, the mixer module comprises a cylindrical shell provided with a lateral wall defining an inner volume fluidly in communication with a dosing module through a first axial opening, the lateral wall further defining a plurality of openings configured to enable passage of the urea mixture coming from the dosing module from the inner volume to some of the plurality of chemical reaction modules, a first portion of the plurality of openings have a greater cross-sectional area than a second portion of the plurality of openings, and the second portion of the plurality of openings is positioned downstream from the first portion of the plurality of openings along a direction of flow of the urea mixture through the cylindrical shell;
    an outlet fluidly connected to an outlet tube of the vehicle, and wherein the inlet, the plurality of chemical reaction modules, the urea mixer module, and the outlet are arranged to define a path through the after treatment system module; and
    deflector means configured to impart a swirling motion to the flow of exhaust gases before the flow of exhaust gases enters the urea mixer module.

2. The after treatment system module according to claim 1, wherein the deflector means comprise a baffle configured to define a narrowing and to force the flow of exhaust gases to pass through the narrowing to cause an increase in a velocity of the flow of exhaust gases and to impart a swirling motion of the flow of exhaust gases.

3. The after treatment system module according to claim 2, wherein the baffle has a curved shape, a convex part of the curved shape being faced to the flow of exhaust gases.

4. The after treatment system module according to claim 2, wherein the urea mixer module is carried by a fitting comprising a first portion and a second portion, the urea mixer module comprising the dosing module carried into the first portion of the fitting, the first portion of the fitting having a dimension smaller than the second portion of the fitting.

5. The after treatment system module according to claim 4, wherein the urea mixer module is configured to inject the urea solution into the flow of exhaust gases, the injection being inclined with respect to the flow of exhaust gases in an angular range lower than 30 degrees.

6. The after treatment system module according to claim 5, wherein the dosing module is configured to inject the urea solution into the flow of exhaust gases, the dosing module comprising an injector configured to inject the urea solution and a dosing module shell defining a volume into which the injector is partially housed and comprising a plurality of openings for enabling the flow of exhaust gases to flow inside the volume.

7. The after treatment system module according to claim 6, wherein each of the plurality of openings of the dosing module shell is provided with a baffle configured to contribute to generate a swirling motion to a portion of the flow of exhaust gases passing through the plurality of openings of the dosing module shell.

8. The after treatment system module according to claim 7, wherein the plurality of openings of the dosing module shell are equally circumferentially spaced around a longitudinal axis of the dosing module shell.

9. The after treatment system module according to claim 8, wherein each baffle of the plurality of openings of the dosing module shell is inclined with respect to the dosing module shell so as to define a swirling motion of the portion of the flow of exhaust gases around the longitudinal axis.

10. The after treatment system module according to claim 1, wherein at least one of the plurality of openings of the lateral wall has a different shape with respect to another of the plurality of openings of the lateral wall.

11. The after treatment system module according to claim 1, wherein the plurality of openings of the lateral wall have a circular shape.

* * * * *